(12) United States Patent
Soukhman et al.

(10) Patent No.: US 11,360,691 B2
(45) Date of Patent: Jun. 14, 2022

(54) GARBAGE COLLECTION IN A STORAGE SYSTEM AT SUB-VIRTUAL BLOCK GRANULARITY LEVEL

(71) Applicant: EMC IP Holding Company LLC, Hopkinton, MA (US)

(72) Inventors: Alex Soukhman, Raanana (IL); Uri Shabi, Tel Mond (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/897,388

(22) Filed: Jun. 10, 2020

(65) Prior Publication Data

US 2021/0389899 A1 Dec. 16, 2021

(51) Int. Cl.
*G06F 3/06* (2006.01)
*G06F 12/10* (2016.01)

(52) U.S. Cl.
CPC ............ *G06F 3/0652* (2013.01); *G06F 3/064* (2013.01); *G06F 3/0608* (2013.01); *G06F 3/0673* (2013.01); *G06F 12/10* (2013.01); *G06F 2212/657* (2013.01)

(58) Field of Classification Search
CPC ...... G06F 3/0608; G06F 3/064; G06F 3/0673; G06F 2212/657; G06F 3/0652; G06F 12/10
USPC .................................................. 711/165, 103
See application file for complete search history.

(56) References Cited

U.S. PATENT DOCUMENTS

| | | | |
|---|---|---|---|
| 8,954,383 B1 | 2/2015 | Vempati et al. | |
| 9,003,227 B1 | 4/2015 | Patel et al. | |
| 9,104,675 B1 | 8/2015 | Clark et al. | |
| 9,430,503 B1* | 8/2016 | Delgado | G06F 16/21 |
| 9,778,996 B1 | 10/2017 | Bono et al. | |
| 10,210,048 B2 | 2/2019 | Sancheti | |
| 10,474,367 B1 | 11/2019 | Mallick et al. | |
| 2003/0065899 A1* | 4/2003 | Gorobets | G06F 3/0613 711/165 |

(Continued)

OTHER PUBLICATIONS

G. Xu et al., "LIPA: A Learning-based Indexing and Prefetching Approach for Data Deduplication," Conference: 2019 35th Symposium on Mass Storage Systems and Technologies (MSST), May 20-24, 2019, 12 pages.

(Continued)

*Primary Examiner* — Hashem Farrokh
(74) *Attorney, Agent, or Firm* — Ryan, Mason & Lewis, LLP

(57) ABSTRACT

At least one processing device is configured to select a virtual block corresponding to a physical block in a storage system, wherein the virtual block comprises a plurality of pages with one or more pages of the virtual block respectively pointing to one or more data portions in the physical block. The at least one processing device is also configured to identify a target physical block and one or more virtual blocks corresponding to the target physical block. The at least one processing device is further configured to move at least one data portion from the physical block to the target physical block. Still further, the at least one processing device is configured to redirect the at least one page of the virtual block corresponding to the at least one moved data portion to one of the one or more virtual blocks corresponding to the target physical block.

20 Claims, 12 Drawing Sheets

(56) References Cited

U.S. PATENT DOCUMENTS

| | | | |
|---|---|---|---|
| 2006/0059296 A1* | 3/2006 | Meir | G06F 12/0246 711/103 |
| 2006/0161723 A1* | 7/2006 | Sena | G06F 12/0246 711/103 |
| 2012/0151252 A1* | 6/2012 | Harris | G06F 12/08 714/6.13 |
| 2013/0024644 A1* | 1/2013 | Givargis | G06F 3/0608 711/203 |
| 2015/0378886 A1* | 12/2015 | Nemazie | G06F 3/0619 711/103 |

OTHER PUBLICATIONS

NVM Express, "NVM Express, Revision 1.3," NVM Express, May 1, 2017, 282 pages.

Commvault, "Storage Policy (Snapshot)" https://documentation.commvault.com/commvault/v11/article?p=60105_1.htm, Sep. 12, 2019, 3 pages.

Oracle, "Managing Snapshots," https://docs.cloud.oracle.com/en-us/iaas/Content/File/Tasks/managingsnapshots.htm, 2020, 3 pages.

U.S. Appl. No. 16/260,660, filed Jan. 29, 2019, and entitled "System and Method for Aggregating Metadata Changes in a Storage System."

U.S. Appl. No. 16/861,986 filed in the name of Vladimir Shveidel et al. on Apr. 29, 2020, and entitled "Lockless Metadata Binary Tree Access."

U.S. Appl. No. 16/862,733 filed in the name of Alexander S. Mathews et al. on Apr. 30, 2020, and entitled "Finding Storage Objects of a Snapshot Group Pointing to a Logical Page in a Logical Address Space of a Storage System."

U.S. Appl. No. 16/862,735 filed in the name of Dixitkumar Vishnubhai Patel et al. on Apr. 30, 2020, and entitled "Mapping Virtual Block Addresses to Portions of a Logical Address Space that Point to the Virtual Block Addresses."

U.S. Appl. No. 16/862,740 filed in the name of Rohit K. Chawla et al. on Apr. 30, 2020, and entitled "Generating Recommendations for Initiating Recovery of a Fault Domain Representing Logical Address Space of a Storage System."

U.S. Appl. No. 16/863,433 filed in the name of Sorin Faibish et al. on Apr. 30, 2020, and entitled "Cache Retention for Inline Deduplication Based on Number of Physical Blocks with Common Fingerprints Among Multiple Cache Entries."

U.S. Appl. No. 16/879,459 filed in the name of Yousheng Liu et al. on May 20, 2020, and entitled "Reusing Overwritten Portion of Write Buffer of a Storage System."

U.S. Appl. No. 16/888,668 filed in the name of Kundan Kumar et al. on May 30, 2020, and entitled "Selective Snapshot Creation Using Source Tagging of Input-Output Operations."

* cited by examiner

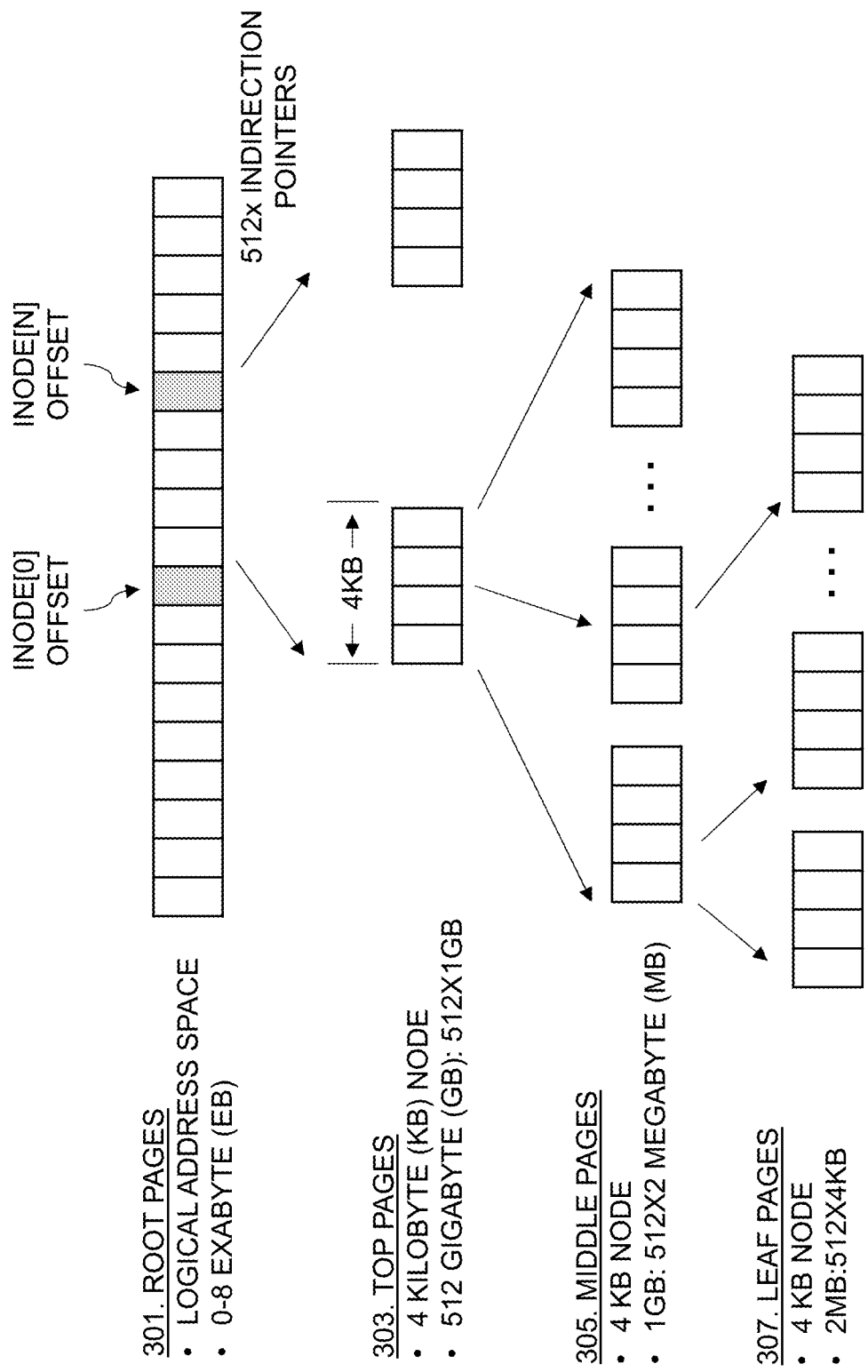

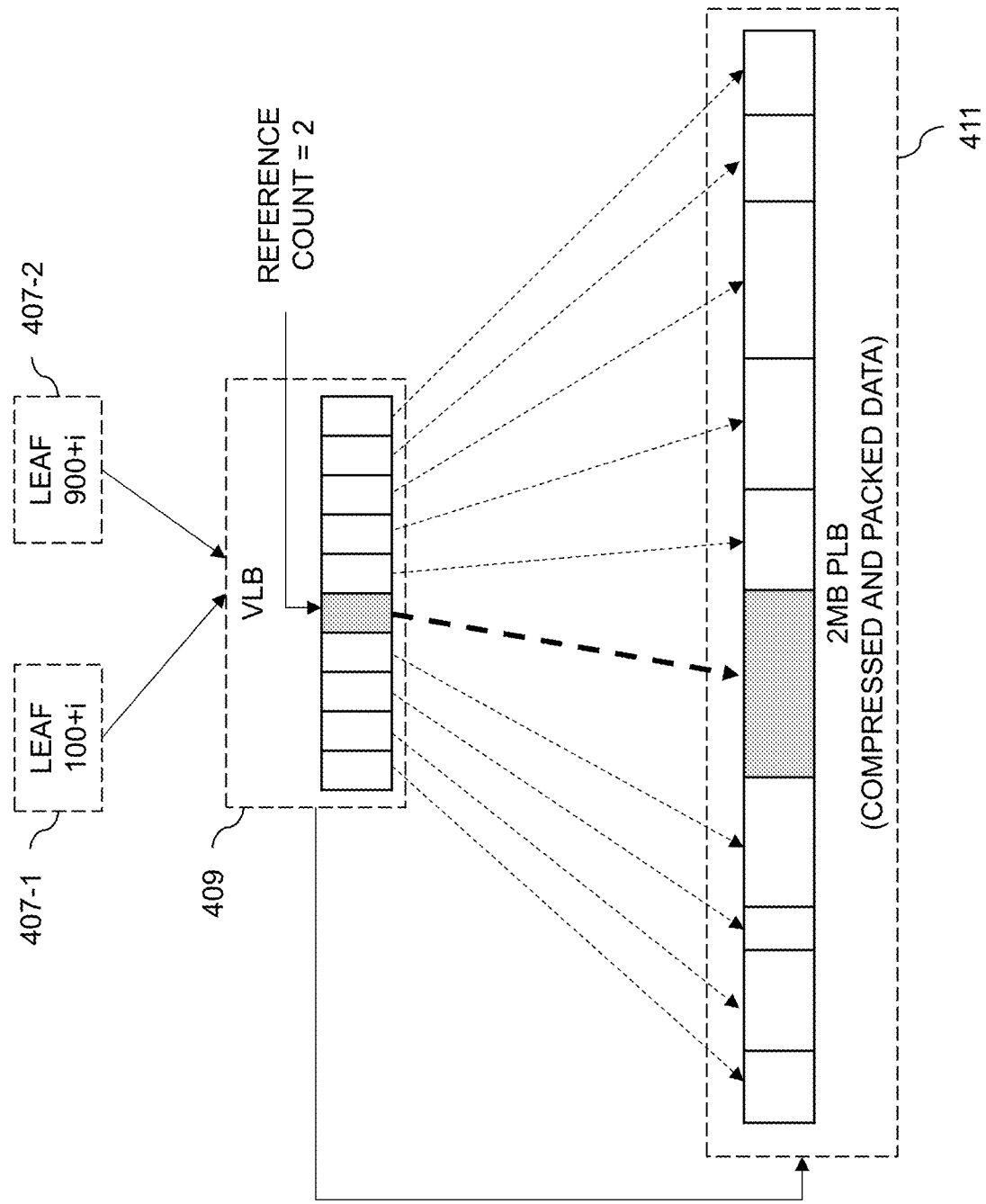

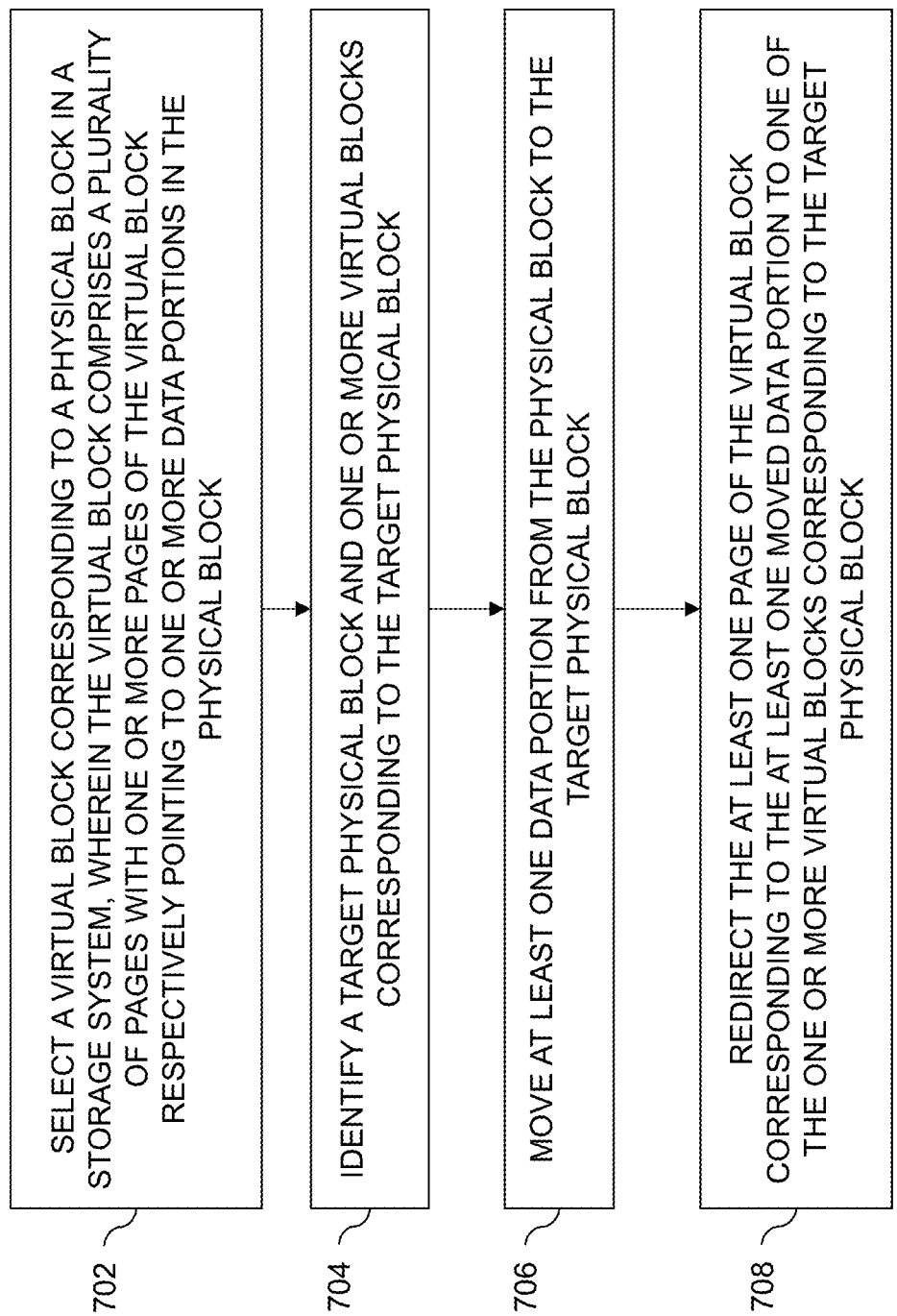

GARBAGE COLLECTION IN A STORAGE SYSTEM AT SUB-VIRTUAL BLOCK GRANULARITY LEVEL

FIELD

The field relates generally to information processing, and more particularly to storage in information processing systems.

BACKGROUND

Storage arrays and other types of storage systems are often shared by multiple host devices (hosts) over a network. Applications running on the host devices each include one or more processes that perform the application functionality. Such processes issue input-output (IO) operation requests for delivery to the storage systems. Storage controllers of the storage systems service such requests for IO operations. The IO operations include, but are not limited to, read operations and write operations. Storage systems typically employ garbage collection including a defragmentation process to create large empty chunks to store user data associated with the various IO operations. Garbage collection typically involves user data relocation and creates overhead both for user data movement and virtual layer updates during the defragmentation process. Accordingly, garbage collection in a storage system can present significant challenges.

SUMMARY

Illustrative embodiments of the present disclosure provide techniques for performing garbage collection in a storage system, particularly at a sub-virtual block granularity level.

For example, in one embodiment, an apparatus comprises at least one processing device comprising a processor coupled to a memory. The at least one processing device is configured to select a virtual block corresponding to a physical block in a storage system, wherein the virtual block comprises a plurality of pages with one or more pages of the virtual block respectively pointing to one or more data portions in the physical block. The at least one processing device is also configured to identify a target physical block and one or more virtual blocks corresponding to the target physical block. The at least one processing device is further configured to move at least one data portion from the physical block to the target physical block. Still further, the at least one processing device is configured to redirect the at least one page of the virtual block corresponding to the at least one moved data portion to one of the one or more virtual blocks corresponding to the target physical block.

Advantageously, illustrative embodiments provide, inter alia, garbage collection granularity at a virtual block page level (i.e., sub-virtual block granularity level).

These and other illustrative embodiments include, without limitation, methods, apparatus, networks, systems and processor-readable storage media.

BRIEF DESCRIPTION OF THE DRAWINGS

FIGS. 3A and 3B illustrate a tree structure for a logical address space in an illustrative embodiment.

FIGS. 4A and 4B illustrate deduplication using a virtual large block of the tree structure of FIGS. 3A and 3B in an illustrative embodiment.

FIG. 7 is a flow diagram of an exemplary process for performing one or more garbage collection operations in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
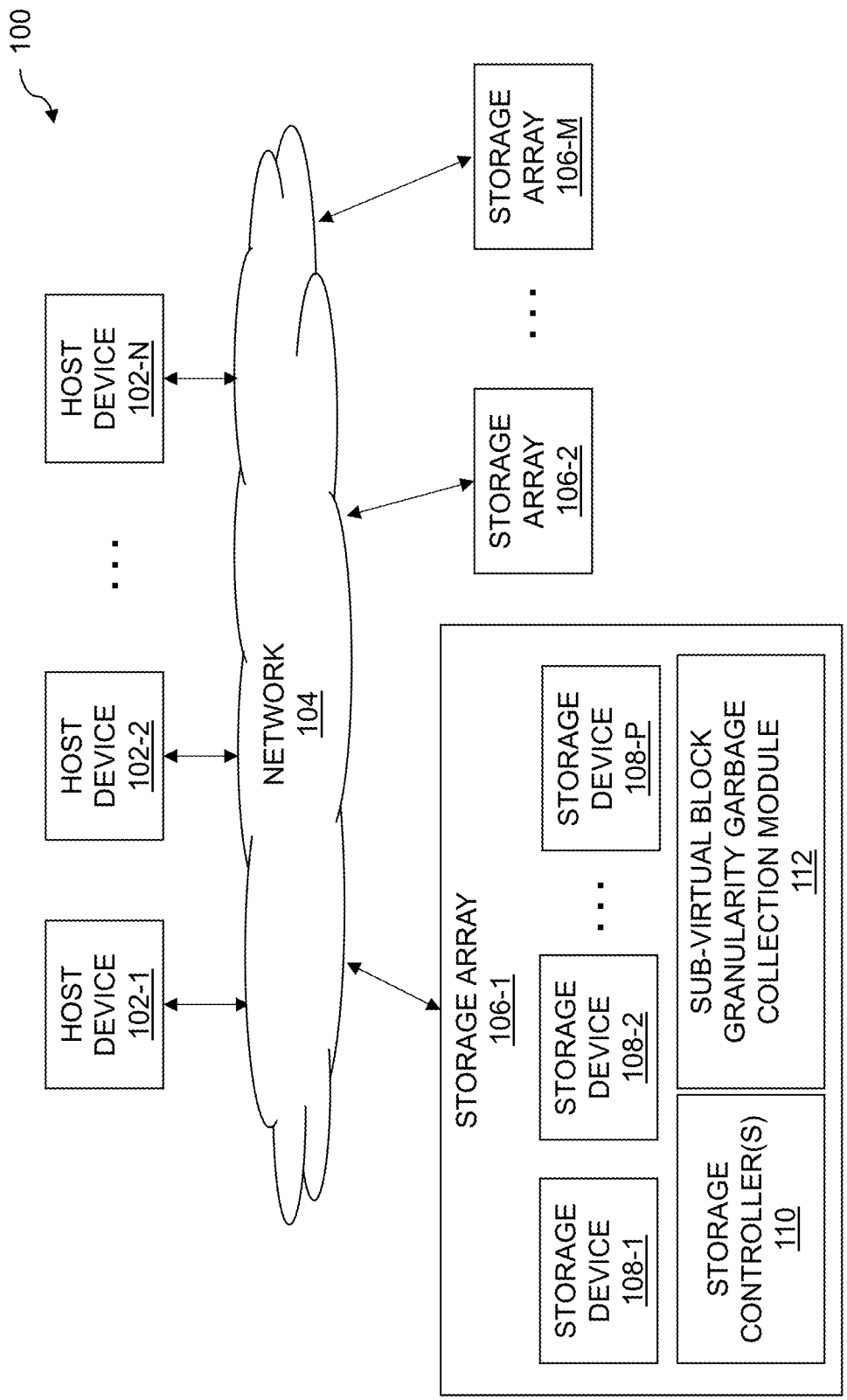
FIG. 1 is a block diagram of an information processing system including a storage array configured with functionality for performing one or more garbage collection operations in an illustrative embodiment.

FIG. 1 shows an information processing system 100 configured in accordance with an illustrative embodiment. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108-1, 108-2, . . . 108-P (collectively, storage devices 108) each storing data utilized by one or more applications running on the host devices 102. The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands, e.g., a read operation comprises one or more read commands and a write operation comprises one or more write commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of the host devices 102 and the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

The storage array 106-1 in the present embodiment may comprise additional components not explicitly shown in the figure, such as a response time control module and IO operation priority queues, illustratively configured to make use of the above-described persistent memory. For example, the response time control module may be used to implement storage array-based adjustments in response time for particular IO operations based at least in part on service level objective (SLO) information stored by the storage array 106-1 in its persistent memory. The response time control module is assumed to operate in conjunction with the above-noted IO operation priority queues.

The storage array 106-1 illustratively utilizes its IO operation priority queues to provide different levels of performance for IO operations. For example, the IO operation priority queues may have respective different priority levels.

The storage array 106-1 may be configured to provide different priority levels for different ones of the IO operations by assigning different ones of the IO operations to different ones of the IO operation priority queues. The IO operation priority queues are illustratively associated with respective SLOs for processing of IO operations in the storage array 106-1.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 106.

Numerous other distributed implementations of the host devices 102 and/or the storage array 106 are possible. Accordingly, the storage arrays 106 can also be implemented in a distributed manner across multiple data centers.

Additional examples of processing platforms utilized to implement portions of the system 100 in illustrative embodiments will be described in more detail below in conjunction with FIGS. 8 and 9.

The storage array 106-1 implements a garbage collection module 112, which is an example of what is referred to herein as a "control module" of a storage system. As will be explained in detail herein, the garbage collection module 112 operates at a sub-virtual block granularity level. Although not explicitly shown in FIG. 1 for clarity of illustration, it is assumed in some embodiments that other ones of the storage arrays 106-2 through 106-M implement respective additional instances of a garbage collection module, as well as respective sets of storage devices and storage controllers in a manner similar to that described herein with respect to storage array 106-1. Also, in some embodiments, a single instance of the garbage collection module 112 can perform one or more garbage collection operations not only on storage array 106-1 but also on one or more of storage arrays 106-2 through 106-M. Further, although shown in FIG. 1 as being external to the storage controllers 110 of storage array 106-1, in other embodiments, the garbage collection module 112 may be implemented at least partially within one or more of the storage controllers 110. For example, at least one of the storage controllers 110 may be implemented as a virtual storage controller running on an embedded hypervisor of the storage array 106-1. At least part of the garbage collection module 112 may be part of such a virtual storage controller, or may be run separate from the virtual storage controller on such an embedded hypervisor. An example of an embedded hypervisor is described below in the context of FIG. 2. Various other arrangements are possible, including where at least a portion of the functionality of the garbage collection module 112 is implemented external to the storage array 106-1 (e.g., on a separate server, on a cloud computing infrastructure, etc.).

Functionality of the garbage collection module 112 may be implemented at least in part in the form of software that is stored in memory and executed by a processor. It is to be understood that the particular set of elements shown in FIG. 1 involved in garbage collection operations is presented by way of illustrative example only and, in other embodiments, additional or alternative elements may be used. Thus, another embodiment may include additional or alternative systems, devices and other network entities, as well as different arrangements of modules and other components. It is to be appreciated that these and other features of illustrative embodiments are presented by way of example only, and should not be construed as limiting in any way.

Functionality of the garbage collection module 112 will be further described herein. Before describing garbage collection functionality, an embedded hypervisor of a log structured storage system within which the garbage collection module 112 can be implemented in accordance with illustrative embodiments will be described in the context of FIGS. 2 through 4B. However, it is to be understood that embodiments are not limited to a log structured storage system or any particular storage system. Further, it is to be understood that embodiments can be implemented in storage systems that do not implement embedded hypervisors.

Figure 2:
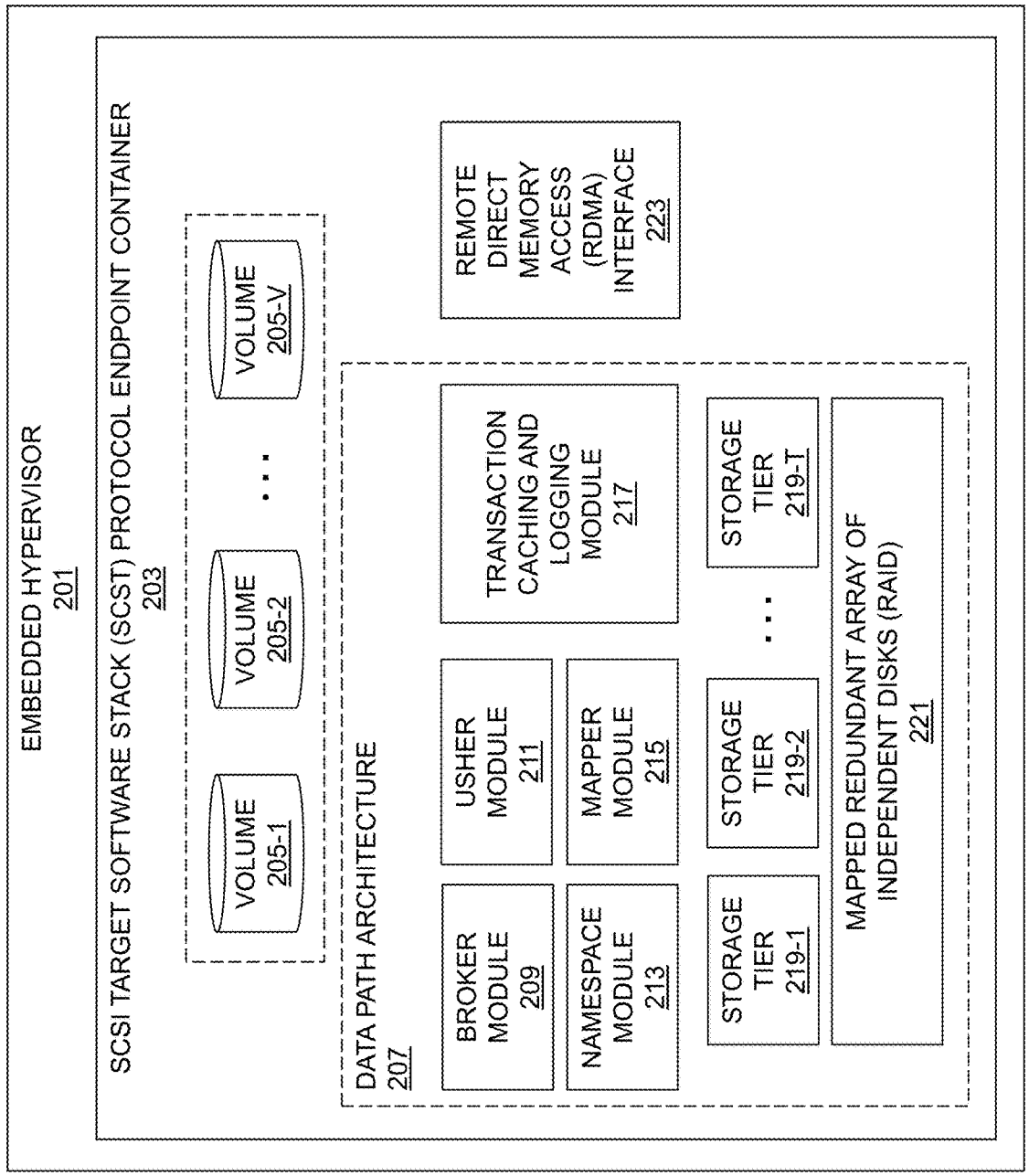
FIG. 2 is a block diagram of an embedded hypervisor implementing a data path architecture in an illustrative embodiment.

FIG. 2 shows a view of a data path architecture 207 for an IO stack of a storage array (e.g., storage array 106-1). The data path architecture 207 is assumed to be implemented on an embedded hypervisor 201 (e.g., a VMware ESXi™ hypervisor) that runs a base container 203 providing an SCSI target software stack (SCST) protocol endpoint. The embedded hypervisor 201 is an example of a "virtual" storage controller of a storage system (e.g., a virtual one of the storage controllers 110 in storage array 106-1). The SCST protocol endpoint container 203 includes a set of volumes 205-1, 205-2, . . . 205-V (collectively, volumes 205) and the data path architecture 207. The data path architecture 207 includes a broker module 209, usher module 211, namespace module 213, mapper module 215, and a transaction caching and logging module 217. The data path architecture 207 also includes a set of storage tiers 219-1, 219-2, . . . 219-T (collectively, storage tiers 219) and a mapped redundant array of independent disks (RAID) 221. The transaction caching and logging module 217 is configured to utilize remote direct memory access (RDMA) interface 223 as described in further detail below.

The broker module 209 is configured to facilitate communication amongst the various other modules of the data path architecture 207. In some embodiments, the data path architecture 207 implements a layered services model (e.g., for copy engines, replication, migration, etc.). The usher module 211 is configured to implement IO request queues, including priority share-based scheduling and Quality of Service (QoS) for IO requests in such queues. The namespace module 213 is configured to implement active/active "thin" volumes and maintain volume attributes. The namespace module 213 is also configured to implement a key-value (K-V) store and directories. The mapper module 215 is configured to implement a thin mapping layer using log-structured writes, with inline compression, deduplication and pattern matching functionality. The mapper module 215 is also configured to implement functionality for snapshotting and determining snapshot differentials, for performing space accounting, and for file system checking (e.g., using a tool such as a Linux file system consistency check (FSCK) tool). The transaction caching and logging module 217 is configured to implement transactions for the active/active volumes, to perform distributed locking, and to implement read/write-back and write-ahead logs. The transaction caching and logging module 217 may comprise two instances, one for data and one for metadata. The mapped RAID 221 is configured to implement distributed virtual striping (e.g., using 4+1 and 8+1 RAID5 implementations) and to provide thin rebuild and distributed sparing. The mapped RAID 221 may support various native block sizes (e.g., 512 bytes (B), 4096B or 4 kilobytes (KB), etc.).

In some embodiments, the usher module 211 implements a data plane polling model. From the producer side (e.g., of the SCST protocol endpoint), requests are submitted using per-core threads. Polling threads pull new IO requests to user space. The polling threads may execute when associated data plane threads are idle. Load balancing, affinity and QoS (e.g., share-based scheduling and traffic shaping) features may be provided.

The namespace module 213, as described above, is configured to create and expose thin block volumes, and provides functionality for volume management and attributes as well as space management and accounting. The namespace module 213 enables or provides a namespace layer that utilizes a block interface with file-like semantics. In the namespace layer, volumes (e.g., volumes 205) are bound to block protocol endpoints (e.g., PE LUNs). The mapper module 215 enables or provides a mapping layer, which exposes a single contiguous thin address space to the namespace layer. The namespace layer consumes the logical address space provided by the mapper layer.

The namespace layer may use a format that includes a "super block" created by an internal format and anchored at a logical block address (LBA) of 0. The super block identifies locations of allocations, an inode table, and a "root" directory. The allocations provide references to extent allocators, used to manage free space, as well as to inodes. The extent allocators may use a binary buddy system, and enable reclaiming and defragmenting (i.e., garbage collection) functionality. In some embodiments, the minimum allocation size is 8 MB, and the minimum allocation size for virtual volumes (VVols) such as volumes 205 is 2 GB. The volume allocation aligns to the "mid" level of the mapper as described in further detail below.

The inode allocators provide references to an inode table, which in some embodiments is scalable to millions of inodes and is organized as a free list. An inode may include various content, such as an object type (e.g., file, directory), family universally unique identifier (UUID), inode number and generation, link count, unique identifier (UID) owner, global identifier (GID) owner, object extent location, create and other timestamps, parent inode number, parent directory cookie, etc. The root inode references a root directory object that contains a list of file names and inodes, while additional inodes contain volume data (e.g., by allocating a data extent and inode, and adding the volume name and inode to the root directory). Multiple volume data extents may be created. Object handles may be used by the usher module 211 to submit IO thru handles (e.g., inodes) to avoid unnecessary name lookup.

The transaction caching and logging module 217 may implement a transaction cache and a transaction log. The transaction cache, in some embodiments, is transactional and provides read and write cache buffering with two instances (e.g., data and metadata). The transaction cache pages data and metadata in and out of memory, and provides local and distributed peer-to-peer (P2P) sticky locks. In some embodiments, an active/active configuration, an ALUA configuration, or combination thereof may be used. For example, the data path architecture 207 may be active/active, while SCST supports both active/active and ALUA. The transaction log provides write-ahead transaction logs, such as by using low latency mirrored NVRAMs for persistence. The transaction cache, for example, may be implemented in-memory (e.g., DRAM), while the transaction log is persisted to NVRAM.

The mapper module 215, as noted above, may provide a mapping layer of the data path architecture 207. The mapping layer may provide various functionality, such as enabling patterns, deduplication, compression, and mapping. Pattern functionality includes storing patterns (e.g., rather than pointer+data), and re-generates data on read, and may include 4 KB of 0s or 1s (where, in this context, 0s are different than unmapped space). Deduplication functionality includes the use of a fingerprint cache and read and compare validation. Compression functionality may include the use of various types of compression algorithms, including QAT hardware offload, LZ Deflate, Dynamic Huffman, etc. In some embodiments, data is compressed and packed into 2 MB data stripes. The mapping functionality includes a thin map, implemented in some embodiments as a 512-way B-tree structure described in further detail below. The thin map in such embodiments is keyed by LBA (e.g., rather than using content-addressable storage (CAS)), and provides snapshot and differential capability along with copy-by-reference. The mapper module 215 may utilize the storage tiers 219 (e.g., using flash tiers, storage-class memory (SCM) tiers, NVRAM tiers, etc.).

Figure 3B:
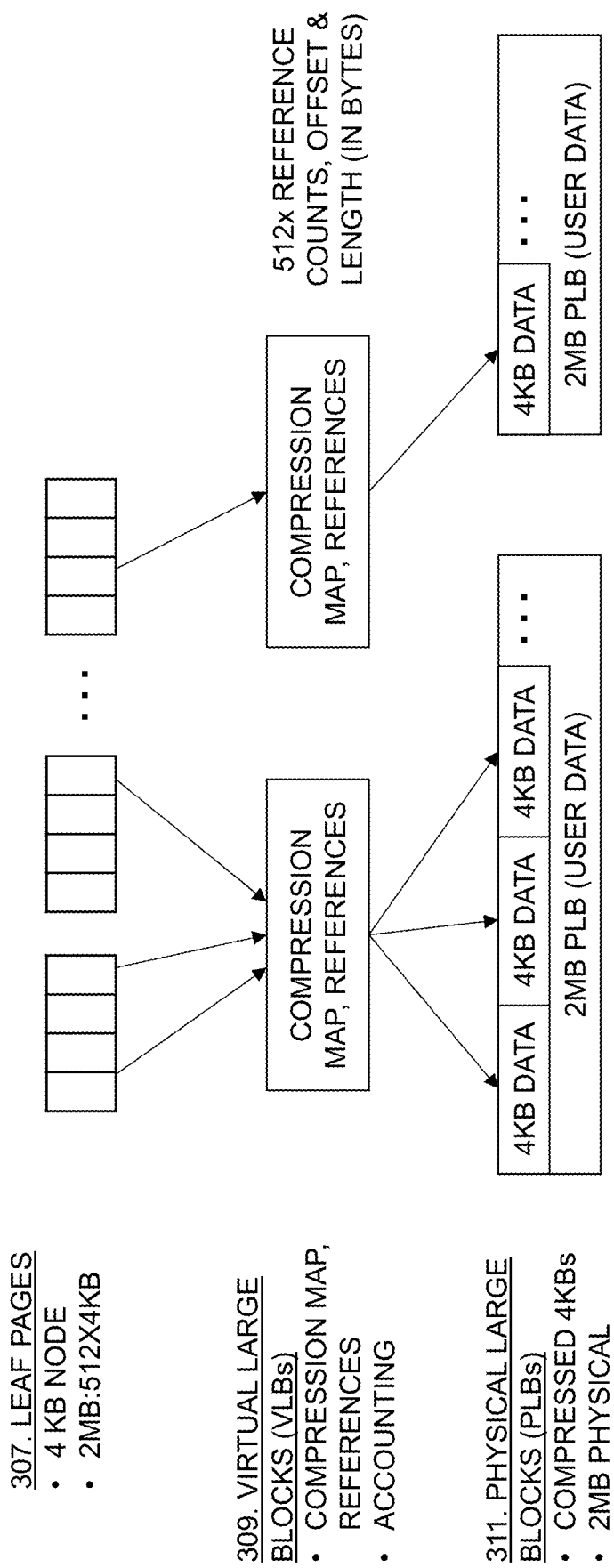

FIGS. 3A and 3B show a tree structure utilized by the mapper module 215 to store data in some embodiments. As noted above, the tree structure may comprise a 512-way B-tree structure, with levels for root pages 301, top pages 303, middle ("mid") pages 305, leaf pages 307, virtual large blocks (VLBs) 309, and physical large blocks (PLBs) 311. As illustrated in FIG. 3A, the root pages 301 provide a logical address space, which in some embodiments ranges from 0 to 8 exabytes (EB). The logical address space, which may be a thin logical address space, includes various inode offsets, two of which are labeled (e.g., inode[0] and inode[1]). Each of the inode offsets for the root pages 301 include a 4 KB node with 512 indirection pointers to respective ones of the top pages 303, each of the top pages 303 also has a 4 KB node with 512 pointers to respective ones of the middle pages 305, and each of the middle pages 305 has a 4 KB node with 512 pointers to respective ones of the leaf pages 307. Each of the leaf pages 307 may represent 2 megabytes (MB), and thus a given one of the middle pages 305 may represent 1 gigabyte (GB) (e.g., 512 of the leaf pages 307×2 MB) and a given one of the top pages 303 may thus represent 512 GB (e.g., 512 of the middle pages 305×1 GB).

As illustrated in FIG. 3B, each of the leaf nodes 307 may include 512 pointers to VLBs 309 each representing 4 KB (e.g., such that a given one of the leaf nodes 307 represents 2 MB as noted above, as 512×4 KB=2 MB). The VLBs 309 include reference counts, compression maps, and accounting information (e.g., offset and length, in bytes (B)) for the PLBs 311. Each of the PLBs 311 provides 2 MB physical space for storing user data (e.g., as a set of 4 KB compressed data blocks).

The mapper module 215 may access the tree structure of FIGS. 3A and 3B using keys, where a key for the root pages 301 level includes a host LBA and inode offset and index, where the index is the key divided by 256 terabytes (TB). At the top pages 303 level, the index is the key modulo 512 GB. At the middle pages 305 level, the index is the key modulo 1 GB. At the leaf pages 307 level, the index is the key modulo 2 MB.

Figure 4A:
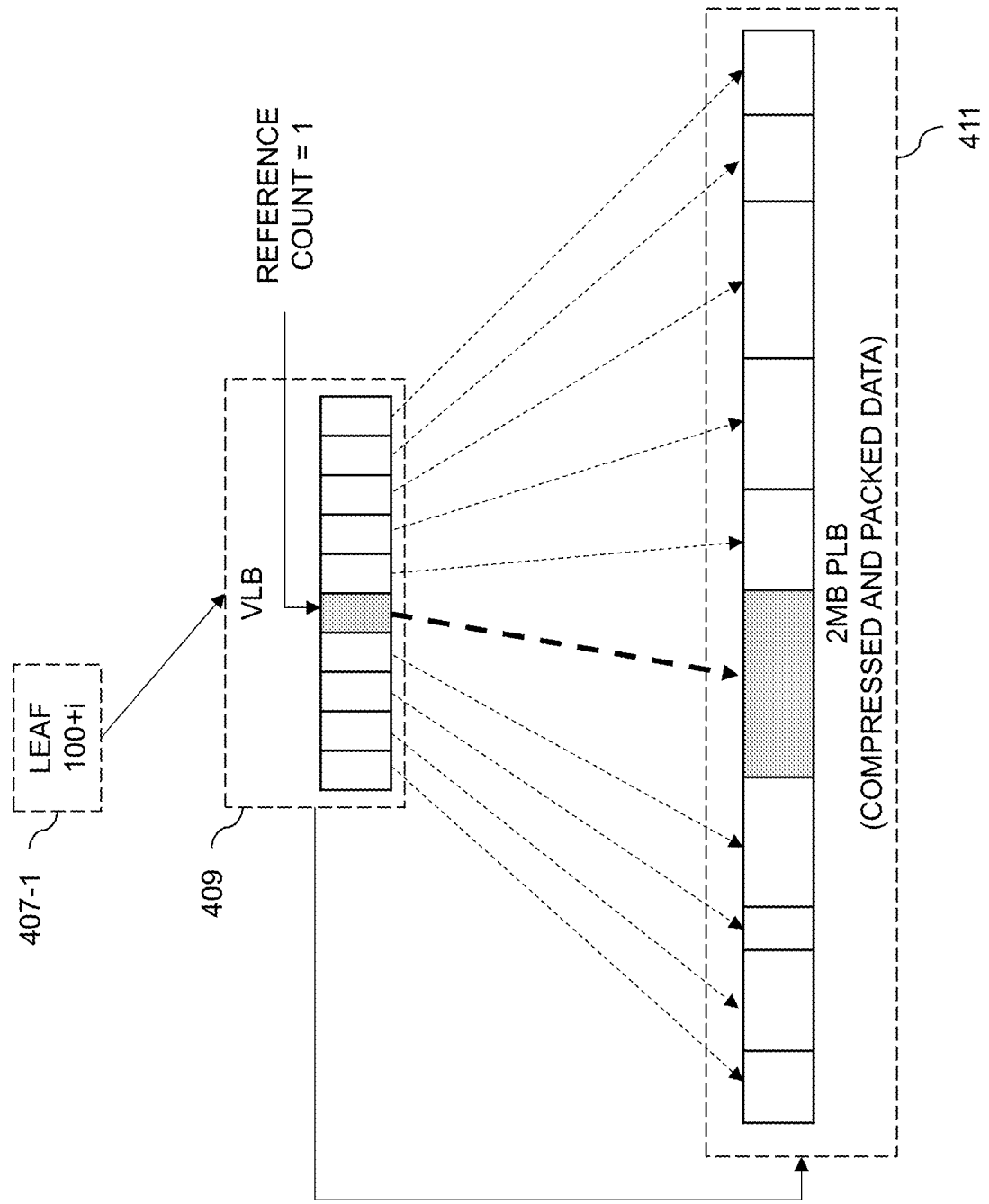

FIGS. 4A and 4B show deduplication using VLBs of the tree structure of FIGS. 3A and 3B. FIGS. 4A and 4B show a given VLB 409 and associated PLB 411 which includes 2 MB of compressed and packed data. The VLB 409 is assumed to contain a block address of the PLB 411, which provides a 2 MB data extent, and an array with 512 virtual entries. The virtual entries of a VLB, such as the 512 entries of VLB 409 in the example of FIGS. 4A and 4B, may be associated with respective virtual block addresses. Each VLB may thus be associated with a VLB extent that comprises a range of virtual block addresses (a VLB extent, in some cases, may include multiple VLBs such that its associated range of virtual block addresses span the multiple VLBs).

Each of the 512 virtual entries of the VLB 409 includes a byte offset to where a compressed 4 KB data portion starts in the PLB 411, as well as a byte length of the compressed 4 KB data portion and a reference count (e.g., the number of leaf page references to that compressed 4 KB data portion). In FIG. 4A, one leaf page 407-1 (e.g. leaf 100+i) references a particular compressed 4 KB data portion (e.g., shaded in gray) in the PLB 411. Thus, as shown in FIG. 4A, the reference count in the VLB corresponding to that portion (e.g., also shaded in gray) is 1. FIG. 4B shows that, when another leaf page 407-2 (e.g., leaf 900+i) also references that particular portion in PLB 411, the reference count for that portion in VLB 409 is updated to 2. In this way, two or more leaf pages can reference the same virtual block address. In the example of FIGS. 4A and 4B, deduplication has a granularity of 4 KB (e.g., the size of each compressed data portion in the PLB 411). Some embodiments enable a global deduplication domain, where any of the leaf pages can reference any of the compressed data portions in any of the PLBs. The reference count, however, may limit deduplication to a certain amount (e.g., 256:1).

To implement deduplication, a deduplication "fingerprint" cache may be utilized. The fingerprint cache may be implemented as a large K-V store, with N-way associative hashes providing fast, in-memory lookup that enables verification of deduplication with read and compare. Consider a piece of data, denoted $data_1$, that is found in the fingerprint cache. This may include hashing $data_1$, where the hash matches a key in the K-V store corresponding to a given VLB. The given VLB is then fetched to find the page referenced, and the corresponding portion of the associated PLB is read, decompressed and then compared to verify that $data_1$ is a duplicate. Consider another piece of data, denoted $data_2$, that is not found in the fingerprint cache. In this case, a new entry is added to the K-V store (e.g., a new K-V pair). If there is no remaining space, entries may be evicted using any suitable cache replacement algorithm, such as a least recently used (LRU) cache replacement algorithm. The data$_2$ is then stored as a new 4 KB data block in one of the PLBs.

The mapper module 215 may implement log-structured writes for efficient full stripe RAID writes (e.g., where each stripe is 2 MB continuing the example above) to flash memory using mapped RAID 221. Pending writes are flushed from the transaction cache or transaction log cache implemented by transaction and log caching module 217. Patterns and duplications are subtracted, then the data is compressed and packed into a stripe. The full stripe is then written and mapped to the thin address space.

Accordingly, a log structured storage system such as the illustrative storage system described above in the context of FIGS. 2 through 4B utilizes a 3-level indirection scheme to access user data. To summarize, the three levels include a leaf level, a VLB level and a PLB level. A leaf level comprises the LBA representation layer (typically organized as a tree structure, as described above). Each leaf entry in the tree structure corresponds to a specific LBA range. The VLB level isolates the LBA layer from physical storage (i.e., from the PLB level). The VLB layer uses blocks (referred to as VLBs) to encapsulate the physical locations of the user data and allow data relocation without the necessity to update leaf entries in the LBA layer. The PLB level stores contiguous chunks of data referred to as PLBs (e.g., 2 MB chunks). The actual user data pages are referenced by VLBs. As such, a data access scheme can be represented as Leaf VLB PLB.

For example, and consistent with what is described above in the context of FIGS. 2 through 4B, after a write operation, a first leaf, corresponding to LBA, points to a VLB that contains references to PLBs where the user data is stored. When the write is deduplicated (deduped), a second leaf points to the same VLB as the first leaf. Since there may be multiple leaves pointing to the same VLB, VLBs manage reference count for every entry. To achieve efficiency, a write to an empty PLB is typically preferred. Therefore, a PLB defragmentation process is applied to merge PLBs with free space and create empty PLBs.

In one non-limiting example, assume that a PLB defragmentation process identifies two PLBs, i.e., PLB1 and PLB2, and merges their data to a single PLB, i.e., PLB3. Further assume that an initial VLB-to-PLB correspondence is as follows: VLB1→PLB1 (i.e., VLB1 points to PLB1) and VLB2→PLB2 (i.e., VLB2 points to PLB2). Accordingly, the PLB defragmentation process moves the data from PLB1 and PLB2 to PLB3, and then releases PLB1 and PLB2 since they are now available. Following the defragmentation process, the VLB-to-PLB correspondence becomes VLB1→PLB3 (i.e., VLB1 points to PLB3) and VLB2→PLB3 (i.e., VLB2 points to PLB3).

Note that the above-described PLB defragmentation process reduces only the number of used physical blocks (PLBs). The number of virtual blocks (VLBs) remains the same since all VLBs are updated to point to the newly created PLB (i.e., PLB3).

Thus, a problem of VLB fragmentation arises. The more PLB defragmentation that occurs, the more virtual blocks are aggregated and the less populated they become. This increases VLB usages, reduces update amortization, and may violate various system level limitations such as, but not limited to, maximum virtual blocks per physical block.

Figure 5:
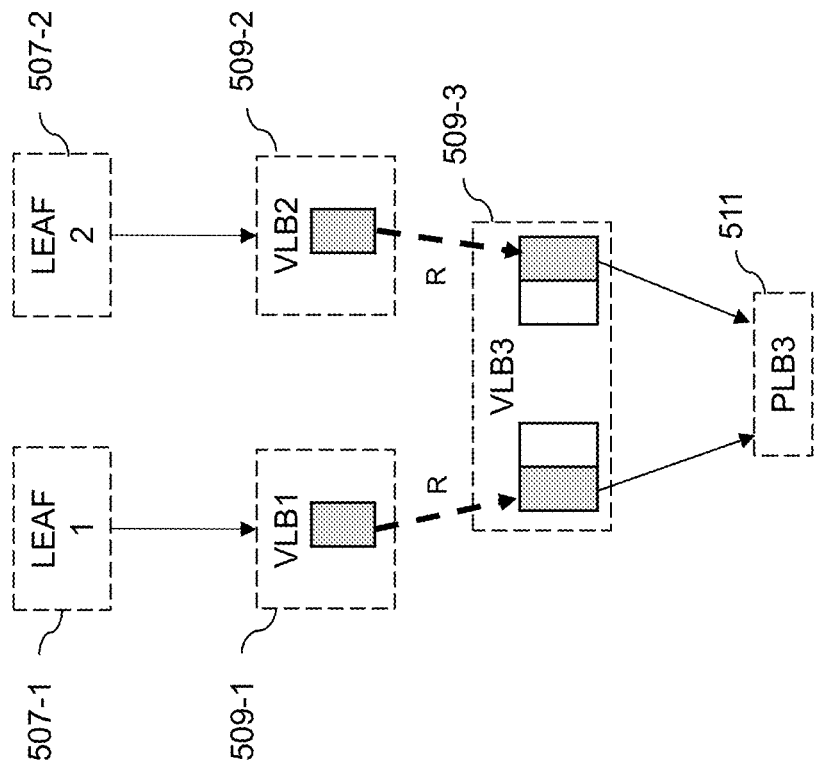
FIG. 5 illustrates virtual block redirection in an illustrative embodiment.

FIG. 5 illustrates a solution for VLB defragmentation using redirection. A main idea of the redirection solution is assigning each VLB a generation index such that leaves point to an entry in a specific generation. As shown in FIG. 5, assume initially that a first leaf 507-1 points to a first VLB 509-1, while a second leaf 507-2 points to a second VLB 509-2. The redirection itself is applied by moving the data reference to a new VLB, i.e., VLB 509-3 and increasing the old VLB generation index by one to obtain the new VLB generation index. The link to the new VLB (VLB 509-3) is stored in the old VLBs (VLBs 509-1 and 509-2) in a redirection table for the previous generation. The movement of the data reference from the old VLB to the new VLB is achieved by a redirection pointer denoted in FIG. 5 by the letter R. When redirection is implemented in this manner, the link from one of the leaves will point to the old VLB with a different index, read the redirection table, and then proceed to the redirected VLB. This method enables relocation of user data to a PLB, e.g., PLB 511, without updating the leaf, i.e., only the VLB update is required.

A typical approach to trigger garbage collection at the user data (PLB) level is to identify two or more stripes (data portions) whose combined used capacity equals the size of a new free (unused or available) stripe (data portion). However, this approach introduces certain limitations. For example, if all PLBs are above 50% used capacity, garbage collection is not performed since data from one PLB will not fit into another PLB. Also, the amortization of garbage collection is lower. That is, with a coarse granularity of all or nothing, there is a large amount of wasted space, since 100% utilization will not be achievable. Still further, most current storage systems employ a 2-to-1 garbage collection approach, i.e., two entire PLBs are combined into one available PLB, thus limiting or even preventing the intended benefits of garbage collection operations.

Illustrative embodiments provide a methodology to significantly improve defragmentation without any change to current persistent data. Given that data is referenced by VLBs as described above, it is realized in accordance with illustrative embodiments that there does not have to be a limitation that a complete PLB must be transferred to another single PLB. Accordingly, illustrative embodiments also remove the requirement that a single VLB must point to a single PLB. Moreover, illustrative embodiments provide additional features to improve control over the granularity of a garbage collection process including, but not limited to, the functionality that VLBs in the storage system may be composed of multiple separate data pages. By way of a non-limiting example, a VLB can be composed of three pages in one illustrative embodiment. Further, illustrative embodiments provide the functionality that each page of a given VLB may be redirected to a different target VLB.

Combining one or more of the above features and functionalities together, illustrative embodiments perform a garbage collection operation at a granularity level of a single VLB page, i.e., referred to herein as "fine granularity" or "sub-virtual block granularity." Currently, PLB defragmentation comprises at least 50% amplification as the system writes one PLB and obtains one free PLB regardless of which PLB has the most available free space (PLB1+PLB2<=100%). Illustrative embodiments use multiple lowest capacity PLBs and combine them VLB page by VLB page. This enables the storage system to extract data from a PLB by redirecting a specific VLB page. Once all VLB pages of the specific PLB are redirected, the PLB is released (freed).

Figure 6A:
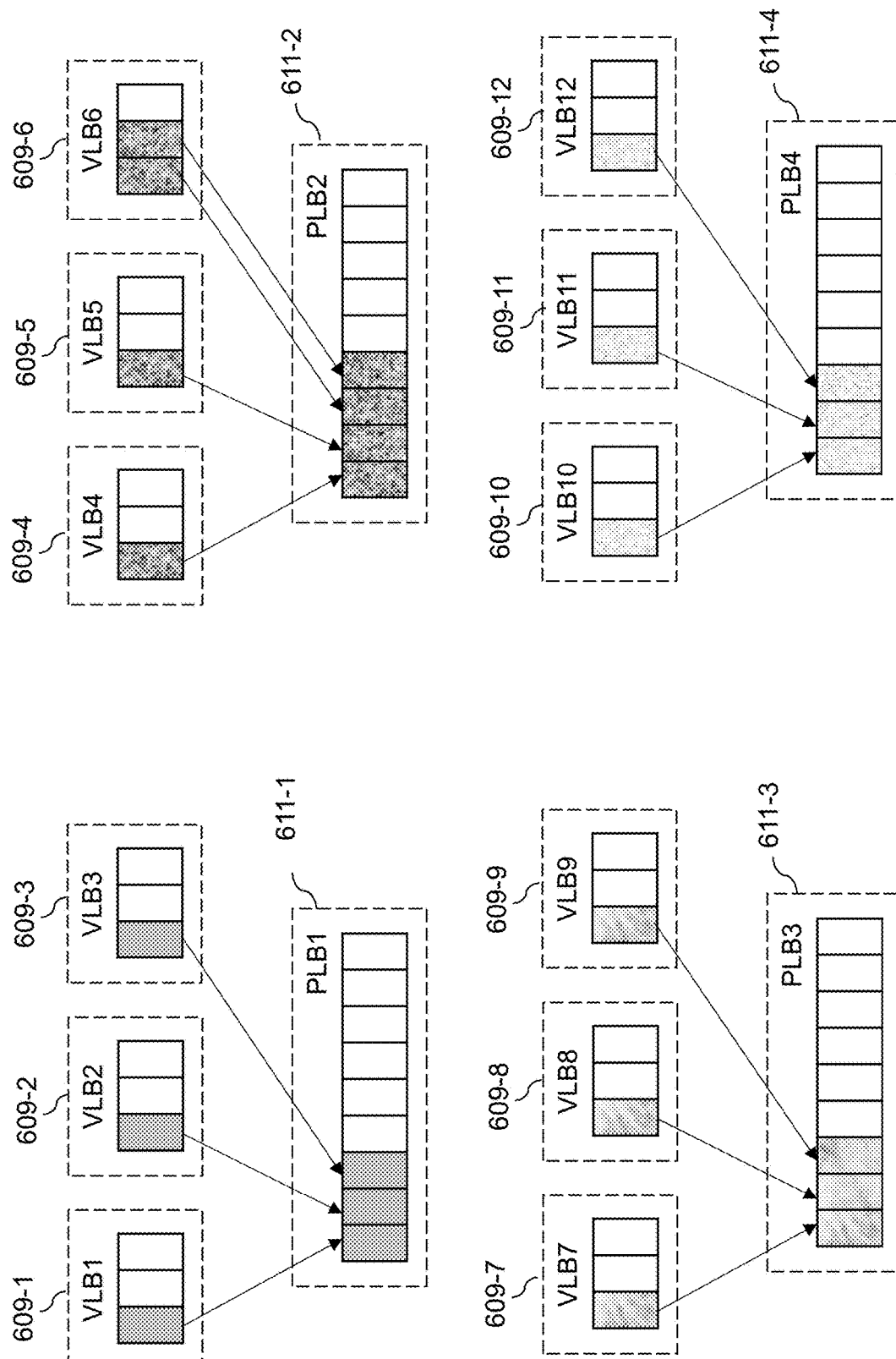
FIGS. 6A and 6B illustrate a garbage collection methodology in an illustrative embodiment.

FIG. 6A illustrates a sub-virtual block granularity garbage collection methodology according to one illustrative embodiment. As shown, there are four PLBs, PLB1, PLB2, PLB3 and PLB4 (labeled 611-1 through 611-4), each with 33% or greater utilization. Note that while nine data portions are shown in each PLB with four being used in PLB2 and three being used in each of PLB1, PLB3 and PLB4 (solid and textured shading denotes used and no shading denotes free), this is a non-limiting example to facilitate explanation. Further, as shown, each of PLB1, PLB3 and PLB 4 is pointed to by three different VLB pages where each VLB has 33% utilization as well, while PLB2 is pointed to by four different VLB pages. In this example, each of VLB1 through VLB12 (labeled 609-1 through 609-12) are partitioned into three pages such that: one page each from VLB1, VLB2 and VLB3 point to a respective data portion in PLB1; one page each from VLB4 and VLB5, and two pages each from VLB6, point to a respective data portion in PLB2; one page each from VLB7, VLB8 and VLB9 point to a respective data portion in PLB3; and one page each from VLB10, VLB11 and VLB12 point to a respective data portion in PLB4. It is to be understood that this is an example and any other VLB-to-PLB pointing arrangement (i.e., VLB page-to-PLB data portion assignment) can be implemented in alternative embodiments.

Given the illustrative arrangement of FIG. 6A described above, the following steps can be performed in a garbage collection process according to an illustrative embodiment. First, the garbage collection process selects PLB1 as the target PLB. As such, the VLBs pointing to PLB1 (i.e., VLB1, VLB2 and VLB3) are the targets for VLB defragmentation. The process selects N VLB pages pointing to data portions in PLB2, PLB3 and/or PLB4 that together fill PLB1 (note that as assumed above, three out of nine data portions of PLB1 are already utilized, and thus PLB1 needs an additional six data portions to be 100% utilized). Then, for each selected VLB page, redirect that VLB page to a target VLBs of PLB1. Following the process, PLB1 is now 100% full. Further, if the VLBs back-pointed from PLB2, PLB3 or PLB4 are fully redirected, then the corresponding PLBs have no data and should be freed.

Figure 6B:
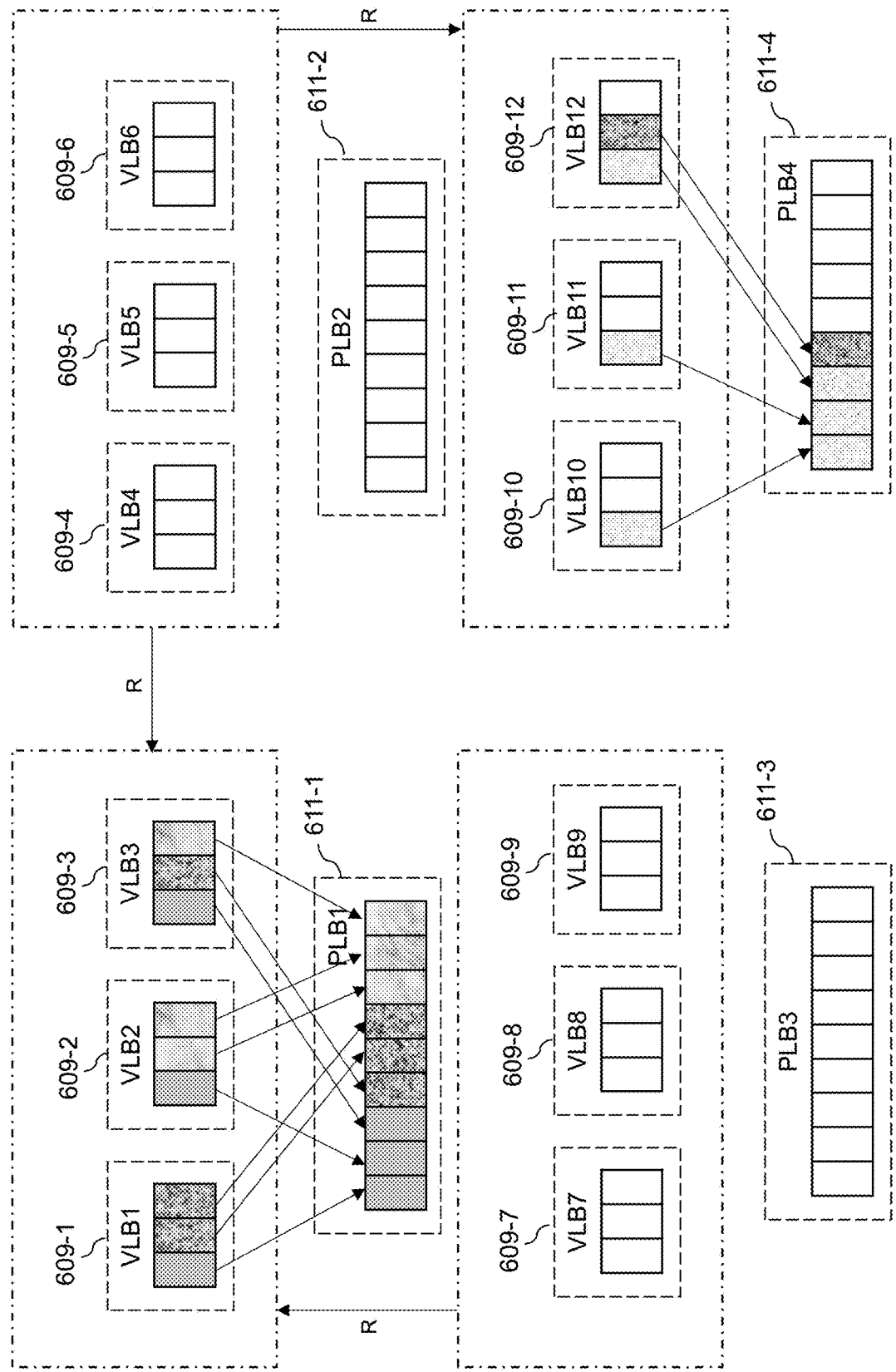

An exemplary result of the sub-virtual block granularity defragmentation described above is shown in FIG. 6B. It is to be understood, however, that given the illustrative arrangement shown in FIG. 6A, many different garbage collection results may be achieved other than the one example shown in FIG. 6B. More particularly, it is assumed that three VLB pages pointing to data portions in PLB2 and three VLB pages pointing to data portions in PLB3 are identified. The corresponding three data portions from PLB3 and three of the four data portions of PLB2 are transferred (moved) to PBL1, to thereby fill PLB1 to 100% used capacity, and the one remaining data portion of PLB2 is transferred to PLB4, thus freeing up PLB2 and PLB3 with 0% used capacity. Also, the respective VLB pages from each of the VLBs pointing to PLB2 and PLB3 are redirected (denoted by letter R in FIG. 6B) to respective VLB pages corresponding to PLB1 or PLB4 (also as denoted by the shading). Note that the VLB page-to-VLB page redirection assignment can be determined in any suitable manner, e.g., the pages in VLB4 and VLB5 can be redirected to VLB1, one page from VLB6 can be redirected to VLB3 and the other page of VLB6 can be redirected to VLB12, and the pages in VLB7, VLB8 and VLB9 can be redirected to VLB2 and VLB3. Other redirection assignments can be implemented in alternative embodiments. Note that, in accordance with illustrative embodiments, data pages from the same VLB can advantageously be redirected to VLBs corresponding to different PLBs (in this example, one page from VLB6 is redirected to VLB3 and the other page of VLB6 is redirected to VLB12).

Advantageously, the sub-virtual block granularity garbage collection methodology provides fine granular construction of PLBs (granularity is at the level of VLB page content), and no additional write amplification nor additional data structures are required.

FIG. 7 is a flow diagram of an exemplary process 700 for performing one or more garbage collection operations in an illustrative embodiment. As shown in process 700, step 702 selects a virtual block corresponding to a physical block in a storage system, wherein the virtual block comprises a plurality of pages with one or more pages of the virtual block respectively pointing to one or more data portions in the physical block. Step 704 identifies a target physical block and one or more virtual blocks corresponding to the target physical block. Further, step 706 moves at least one data portion from the physical block to the target physical block. Still further, step 708 redirects the at least one page of the virtual block corresponding to the at least one moved data portion to one of the one or more virtual blocks corresponding to the target physical block.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for managing one or more garbage collection operations of a storage system will now be described in greater detail with reference to FIGS. 8 and 9. Although described in the context of system 100, these platforms may also be used to implement at least portions of other information processing systems in other embodiments.

Figure 8:
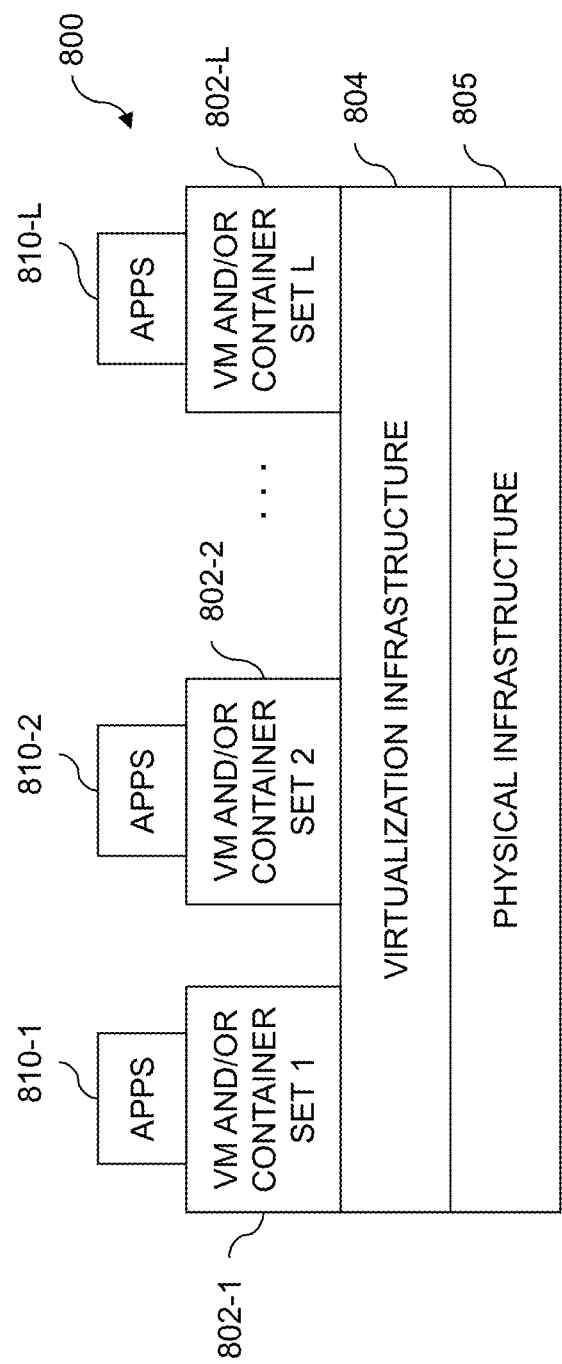
FIGS. 8 and 9 show examples of processing platforms that may be utilized to implement at least a portion of an information processing system in illustrative embodiments.
Figure 9:
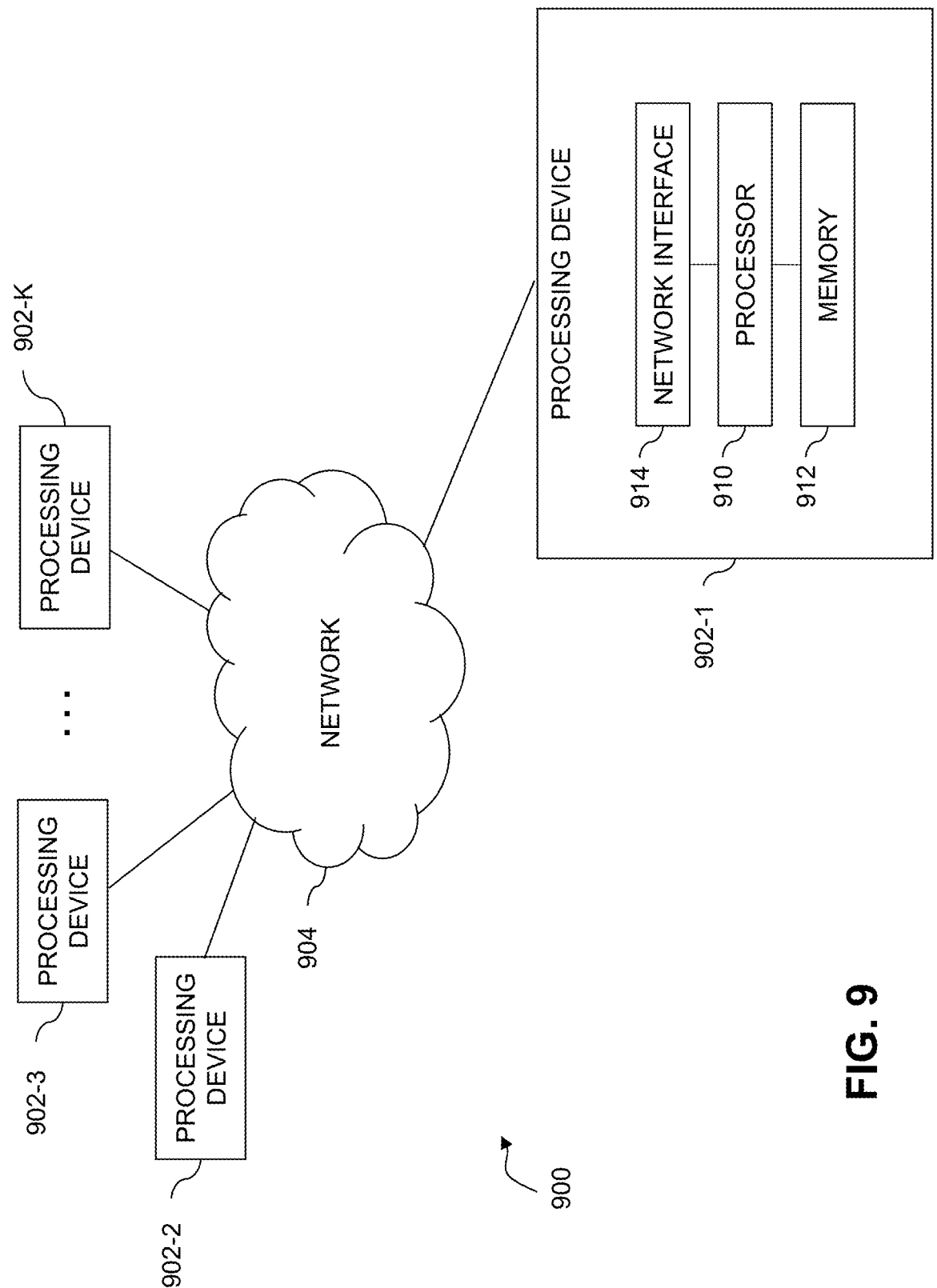

FIG. 8 shows an example processing platform comprising cloud infrastructure 800. The cloud infrastructure 800 comprises a combination of physical and virtual processing resources that may be utilized to implement at least a portion of the information processing system 100 in FIG. 1. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. A hypervisor platform may be used to implement a hypervisor within the virtualization infrastructure 804, where the hypervisor platform has an associated virtual infrastructure management system. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 912 may comprise random access memory (RAM), read-only memory (ROM), flash memory or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for managing one or more write operations by reusing one or more overwritten portions of a write buffer of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, storage devices, tree structures, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to:
select a first one of a plurality of virtual blocks corresponding to a first one of a plurality of physical blocks in a storage system, wherein the first virtual block comprises a plurality of pages with at least a first one of the plurality pages of the first virtual block pointing to at least a first data portion in the first physical block and at least a second one of the plurality of pages of the first virtual block pointing to at least a second data portion in at least a second one of the plurality of physical blocks in the storage system;
identify a target one of the plurality of physical blocks other than the first physical block and one or more additional ones of the plurality of virtual blocks corresponding to the target physical block;
move the first data portion from the first physical block to the target physical block; and
redirect the first page of the first virtual block corresponding to the first data portion moved from the first physical block to the target physical block to one of the one or more additional ones of the plurality of virtual blocks corresponding to the target physical block.

2. The apparatus of claim 1, wherein the at least one processing device is further configured to, for the second page of the first virtual block pointing to the second data portion in the first physical block:
identify another target one of the plurality of physical blocks other than the second physical block and one or more other additional ones of the plurality of virtual blocks corresponding to the other target physical block;
move the second data portion from the second physical block to the other target physical block; and
redirect the second page of the first virtual block corresponding to the second data portion moved from the second physical block to the other target physical block to one of the one or more other additional ones of the plurality of virtual blocks corresponding to the other target physical block.

3. The apparatus of claim 2, wherein the target physical block and the other target physical block comprise a same physical block in the storage system.

4. The apparatus of claim 1, wherein the at least one processing device is further configured to make available one or more of the first page of the first virtual block and the first data portion of the first physical block for use in a subsequent storage request.

5. The apparatus of claim 1, wherein each of the plurality of virtual blocks comprises at least three pages.

6. The apparatus of claim 1, wherein the storage system comprises a log structured storage system.

7. The apparatus of claim 1, wherein the at least one processing device is further configured to, for a third one of the plurality of pages of the first virtual block pointing to a third data portion in the first physical block:
identify another target one of the plurality of physical blocks other than the first physical block and one or more other additional ones of the plurality of virtual blocks corresponding to the other target physical block;
move the third data portion from the first physical block to the other target physical block; and
redirect the third page of the first virtual block corresponding to the third data portion moved from the first physical block to the other target physical block to one of the one or more other additional ones of the plurality of virtual blocks corresponding to the other target physical block.

8. A computer program product comprising a non-transitory processor-readable storage medium having stored therein program code of one or more software programs, wherein the program code when executed by at least one processing device causes the at least one processing device to perform steps of:
selecting a first one of a plurality of virtual blocks corresponding to a first one of a plurality of physical blocks in a storage system, wherein the first virtual block comprises a plurality of pages with at least a first one of the plurality pages of the first virtual block pointing to at least a first data portion in the first physical block and at least a second one of the plurality of pages of the first virtual block pointing to at least a second data portion in at least a second one of the plurality of physical blocks in the storage system;
identifying a target one of the plurality of physical blocks other than the first physical block and one or more additional ones of the plurality of virtual blocks corresponding to the target physical block;
moving the first data portion from the first physical block to the target physical block; and
redirecting the first page of the first virtual block corresponding to the first data portion moved from the first physical block to the target physical block to one of the one or more additional ones of the plurality of virtual blocks corresponding to the target physical block.

9. The computer program product of claim 8, wherein the program code when executed by the at least one processing device causes the at least one processing device to further perform steps of, for the second page of the first virtual block pointing to the second data portion in the first physical block:
identifying another target one of the plurality of physical blocks other than the second physical block and one or more other additional ones of the plurality of virtual blocks corresponding to the other target physical block;
moving the second data portion from the second physical block to the other target physical block; and
redirecting the second page of the first virtual block corresponding to the second data portion moved from the second physical block to the other target physical block to one of the one or more other additional ones of the plurality of virtual blocks corresponding to the other target physical block.

10. The computer program product of claim 8, wherein the program code when executed by the at least one processing device causes the at least one processing device to further perform the step of making available one or more of the first page of the first virtual block and the first data portion of the first physical block for use in a subsequent storage request.

11. The computer program product of claim 8, wherein each of the plurality of virtual blocks comprises at least three pages.

12. The computer program product of claim 8, wherein the storage system comprises a log structured storage system.

13. The computer program product of claim 8, wherein the target physical block and the other target physical block comprise a same physical block in the storage system.

14. The computer program product of claim 8, wherein the program code when executed by the at least one processing device causes the at least one processing device to further perform steps of, for a third one of the plurality of pages of the first virtual block pointing to a third data portion in the first physical block:
identifying another target one of the plurality of physical blocks other than the first physical block and one or more other additional ones of the plurality of virtual blocks corresponding to the other target physical block;
moving the third data portion from the first physical block to the other target physical block; and
redirecting the third page of the first virtual block corresponding to the third data portion moved from the first physical block to the other target physical block to one of the one or more other additional ones of the plurality of virtual blocks corresponding to the other target physical block.

15. A method comprising steps of:
selecting a first one of a plurality of virtual blocks corresponding to a first one of a plurality of physical blocks in a storage system, wherein the first virtual block comprises a plurality of pages with at least a first one of the plurality pages of the first virtual block pointing to at least a first data portion in the first physical block and at least a second one of the plurality of pages of the first virtual block pointing to at least a second data portion in at least a second one of the plurality of physical blocks in the storage system;
identifying a target one of the plurality of physical blocks other than the first physical block and one or more additional ones of the plurality of virtual blocks corresponding to the target physical block;
moving the first data portion from the first physical block to the target physical block; and redirecting the first page of the first virtual block corresponding to the first data portion moved from the first physical block to the target physical block to one of the one or more additional ones of the plurality of virtual blocks corresponding to the target physical block.

16. The method of claim 15, further comprising, for the second page of the first virtual block pointing to the second data portion in the first physical block:
identifying another target one of the plurality of physical blocks other than the second physical block and one or more other additional ones of the plurality of virtual blocks corresponding to the other target physical block;
moving the second data portion from the second physical block to the other target physical block; and
redirecting the second page of the first virtual block corresponding to the second data portion moved from the second physical block to the other target physical block to one of the one or more other additional ones of the plurality of virtual blocks corresponding to the other target physical block.

17. The method of claim 15, further comprising making available one or more of the first page of the first virtual block and the first data portion of the first physical block for use in a subsequent storage request.

18. The method of claim 15, wherein each of the plurality of virtual blocks comprises at least three pages.

19. The method of claim 15, wherein the target physical block and the other target physical block comprise a same physical block in the storage system.

20. The method of claim 15, further comprising, for a third one of the plurality of pages of the first virtual block pointing to a third data portion in the first physical block:
identifying another target one of the plurality of physical blocks other than the first physical block and one or more other additional ones of the plurality of virtual blocks corresponding to the other target physical block;
moving the third data portion from the first physical block to the other target physical block; and
redirecting the third page of the first virtual block corresponding to the third data portion moved from the first physical block to the other target physical block to one of the one or more other additional ones of the plurality of virtual blocks corresponding to the other target physical block.

* * * * *